United States Patent
Lakkis

(10) Patent No.: US 8,467,331 B2
(45) Date of Patent: Jun. 18, 2013

(54) COMMON MODE AND UNIFIED FRAME FORMAT

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 823 days.

(21) Appl. No.: 12/496,496

(22) Filed: Jul. 1, 2009

(65) Prior Publication Data

US 2010/0061320 A1    Mar. 11, 2010

Related U.S. Application Data

(60) Provisional application No. 61/095,509, filed on Sep. 9, 2008.

(51) Int. Cl.
*H04B 7/204* (2006.01)
*H04J 1/00* (2006.01)
*H04B 7/208* (2006.01)

(52) U.S. Cl.
USPC .......................... 370/319; 370/343; 370/344

(58) Field of Classification Search
None
See application file for complete search history.

(56) References Cited

U.S. PATENT DOCUMENTS

| | | | |
|---|---|---|---|
| 7,046,716 | B1 | 5/2006 | Miao |
| 7,653,020 | B2 * | 1/2010 | Roberts ..................... 370/318 |
| 2003/0012302 | A1 * | 1/2003 | Webster et al. ............ 375/316 |
| 2004/0218683 | A1 | 11/2004 | Batra et al. |
| 2005/0238087 | A1 * | 10/2005 | Yang et al. ................. 375/219 |
| 2005/0246606 | A1 * | 11/2005 | Cameron et al. ........... 714/752 |
| 2007/0113159 | A1 | 5/2007 | Lakkis |
| 2009/0163143 | A1 * | 6/2009 | De Rore ...................... 455/63.1 |
| 2009/0252104 | A1 * | 10/2009 | Zhang et al. ................ 370/329 |

FOREIGN PATENT DOCUMENTS

| | | |
|---|---|---|
| KR | 20060092822 A | 8/2006 |
| KR | 20070061927 A | 6/2007 |
| RU | 2328828 C1 | 7/2008 |
| WO | WO0051392 A1 | 8/2000 |
| WO | 0178489 A2 | 10/2001 |
| WO | WO2009059232 | 5/2009 |
| WO | WO2009140605 | 11/2009 |

OTHER PUBLICATIONS

Hiroshi Harada, "IEEE 802.15-07-0761-10-003C Unified and flexible millimeter wave WPAN systems supported by common mode" TG3C—IEEE 802.15-07-0761-10-003C,, Sep. 18, 2007, pp. 1-62, XP002508475 the whole document pp. 37-39 Appendix I, II : pp. 59 and 60.
International Search Report—PCT/US2009/056269—International Search Authority, European Patent Office, Feb. 3, 2010.
Ryuhei Funada et al: "A design of single carrier based PHY for IEEE 802.15.3c standard" IEEE International Symposium on Personal, Indoor and Mobile Radio Communications. PIMRC, IEEE; PI, XX, Sep. 1, 2007.
pp. 1-5, XP031168950 ISBN: 978-1-4244-1143-6 the whole document abstract V. Frame Format section, A. Preamble subsection figure 3.
Written Opinion—PCT/US2009/056269—ISA/EPO—Mar. 2, 2010.

* cited by examiner

*Primary Examiner* — Ayaz Sheikh
*Assistant Examiner* — Sori Aga
(74) *Attorney, Agent, or Firm* — Steven R. Thiel

(57) ABSTRACT

Certain aspects of the present disclosure relate to a method for generating a frame structure that can be used with multiple transmission schemes, such as a Single Carrier (SC) transmission scheme and an Orthogonal Frequency Division Multiplexing (OFDM) transmission scheme.

43 Claims, 14 Drawing Sheets

US 8,467,331 B2

COMMON MODE AND UNIFIED FRAME FORMAT

CLAIM OF PRIORITY UNDER 35 U.S.C. §119

The present Application for Patent claims priority to Provisional Application No. 61/095,509 filed Sep. 9, 2008, and assigned to the assignee hereof and hereby expressly incorporated by reference herein.

BACKGROUND

1. Field

Certain aspects of the present disclosure generally relate to a wireless communication and, more particularly, to a method for generating a frame structure that is common for different transmission schemes.

2. Background

Millimeter wave communications represent communications using a carrier frequency of approximately 60 GHz. A dual-mode millimeter-wave Physical Layer (PHY) can support a single carrier (SC) modulation and an Orthogonal Frequency Division Multiplexing (OFDM) modulation by employing a common mode (CM) transmission.

The CM is a single-carrier mode used by both SC and OFDM based devices for beaconing, network-control signaling, and base-rate data communications. The CM can be typically employed for interoperability between different devices and different networks. However, a frame structure of the SC transmission mode is substantially different from a frame structure of the OFDM transmission mode, which limits the level of interoperability between the SC and OFDM devices and networks.

Therefore, there is a need in the art for a method to generate a frame structure suitable for use by both SC-modulated and OFDM-modulated transmission signals.

SUMMARY

Certain aspects provide a method for wireless communications. The method generally includes generating a preamble and a data payload, and transmitting a frame comprising the preamble and the data payload, wherein the preamble is transmitted according to a single carrier (SC) transmission scheme at a first chip rate and the data payload is transmitted according to an OFDM transmission scheme at a second chip rate different from the first chip rate.

Certain aspects provide an apparatus for wireless communications. The apparatus generally includes a generator configured to generate a preamble and a data payload, and a transmitter configured to transmit a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate.

Certain aspects provide an apparatus for wireless communications. The apparatus generally includes means for generating a preamble and a data payload, and means for transmitting a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate.

Certain aspects provide a computer-program product for wireless communications. The computer-program product includes a computer-readable medium comprising instructions executable to generate a preamble and a data payload, and transmit a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate.

Certain aspects provide a wireless node. The wireless node generally includes at least one antenna, a generator configured to generate a preamble and a data payload, and a transmitter configured to transmit via the at least one antenna a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate.

Certain aspects provide a method for wireless communications. The method generally includes receiving a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, and detecting the preamble and the data payload.

Certain aspects provide an apparatus for wireless communications. The apparatus generally includes a receiver configured to receive a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, and a detector configured to detect the preamble and the data payload.

Certain aspects provide an apparatus for wireless communications. The apparatus generally includes means for receiving a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate; and means for detecting the preamble and the data payload.

Certain aspects provide a computer-program product for wireless communications. The computer-program product includes a computer-readable medium comprising instructions executable to receive a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, and detect the preamble and the data payload.

Certain aspects provide a wireless node. The wireless node generally includes at least one antenna, a receiver configured to receive via the at least one antenna a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, and a detector configured to detect the preamble and the data payload.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
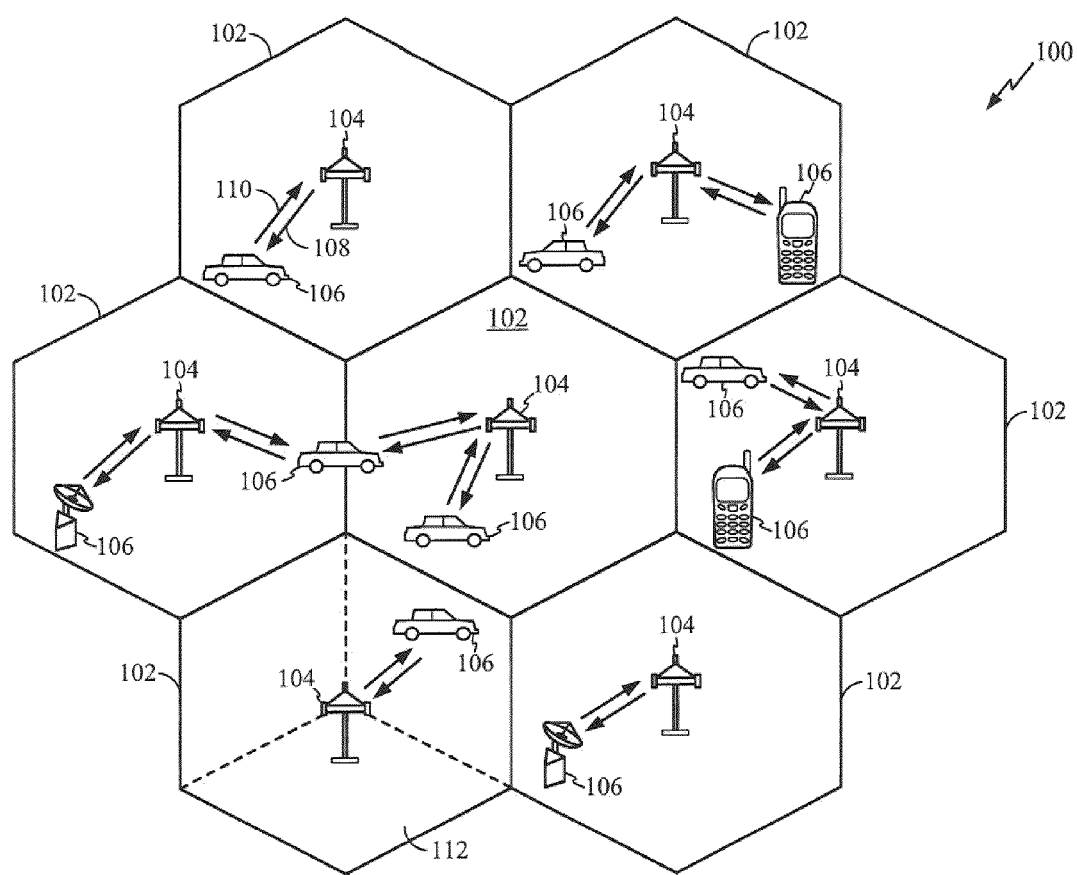
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal or a piconet controller or other type of wireless device.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be advantageous to systems employing Ultra Wide Band (UWB) signals including millimeter-wave signals. However, the present disclosure is not intended to be limited to such systems, as other coded signals may benefit from similar advantages.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology. A cell 102 within the wireless communication system 100 may be a piconet comprising a collection of one or more logically associated devices that share a single identifier with a common coordinator, such as, for example, a piconet controller.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with UWB techniques. If this is the case, the wireless communication system 100 may be referred to as an UWB system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
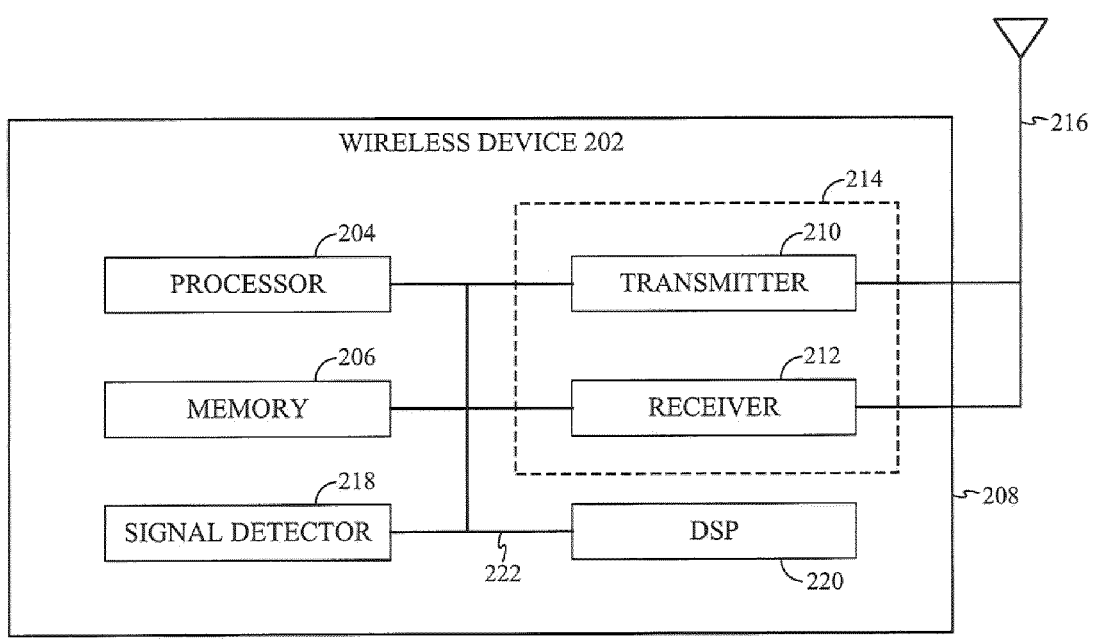
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
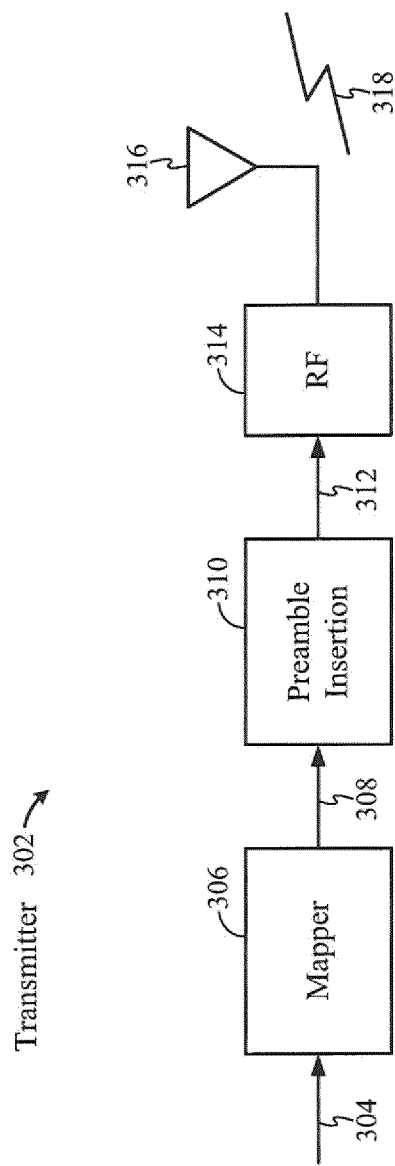
FIG. 3 illustrates an example transmitter that may be used within a wireless communication system in accordance with certain aspects of the present disclosure.

FIG. 3 illustrates an example of a transmitter 302 that may be used within a wireless communication system 100 that utilizes a single-carrier (SC), an Orthogonal Frequency Division Multiplexing (OFDM) or some other transmission technique. Portions of the transmitter 302 may be implemented in the transmitter 210 of a wireless device 202. The transmitter 302 may be implemented in a base station 104 for transmitting data 304 to a user terminal 106. The transmitter 302 may also be implemented in a user terminal 106 for transmitting data 304 to a base station 104 on an uplink 110.

Data 304 to be transmitted are shown being provided as input to a mapper 306. The mapper 306 may map the data stream 304 onto constellation points. The mapping may be done using some modulation constellation, such as binary phase-shift keying (BPSK), quadrature phase-shift keying (QPSK), 8 phase-shift keying (8 PSK), quadrature amplitude modulation (QAM), etc. Thus, the mapper 306 may output a symbol stream 308, which may represent an input into a preamble insertion unit 310.

The preamble insertion unit 310 may be configured for inserting a preamble sequence at the beginning of the input symbol stream 308, and may generate a corresponding data stream 312. The preamble may be known at the receiver and may be utilized for time and frequency synchronization, channel estimation, equalization and channel decoding. The output 312 of the preamble insertion unit 310 may then be up-converted to a desired transmit frequency band by a radio frequency (RF) front end 314. An antenna 316 may then transmit a resulting signal 318 over a wireless channel.

Figure 4:
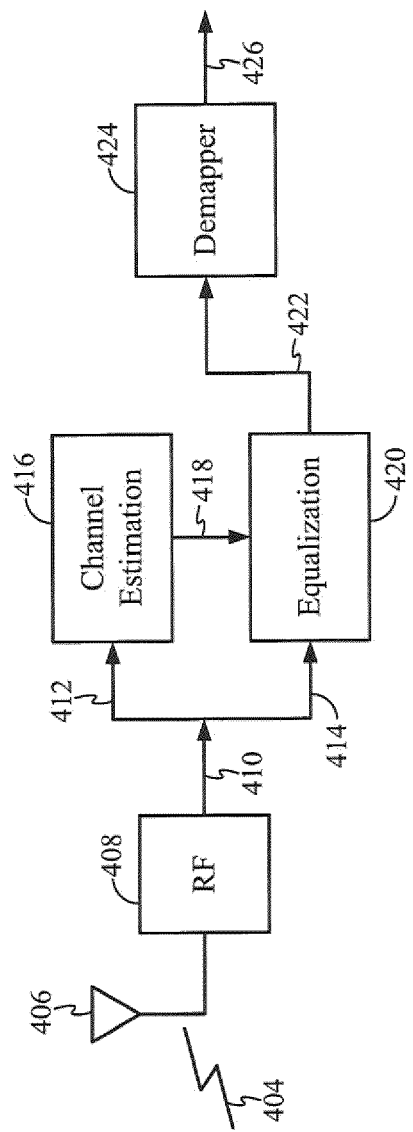
FIG. 4 illustrates an example receiver that may be used within a wireless communication system in accordance with certain aspects of the present disclosure.

FIG. 4 illustrates an example of a receiver 402 that may be used within a wireless device 202 that utilizes a single-carrier or some other transmission technique. Portions of the receiver 402 may be implemented in the receiver 212 of a wireless device 202. The receiver 402 may be implemented in a user terminal 106 for receiving data 404 from a base station 104 on a downlink 108. The receiver 402 may also be implemented in a base station 104 for receiving data 404 from a user terminal 106 on an uplink 110.

When a signal 404 is received by an antenna 406, it may be down-converted to a baseband signal 410 by an RF front end 408. A frame format of the received signal for single-carrier data communications typically comprises a preamble followed by a data portion. A portion of the preamble 412 may be used for channel estimation by unit 416. Received data 414 may be processed by an equalization unit 420 employing previously computed channel estimates 418.

A demapper 424 may input an equalized data stream 422 and may perform the inverse of the symbol mapping operation that was performed by the mapper 306 from FIG. 3 thereby outputting a data stream 426. Ideally, this data stream 426 corresponds to the data 304 that was provided as input to the transmitter 302, as illustrated in FIG. 3.

Common Mode Frame Structure

The wireless system 100 illustrated in FIG. 1 can represent an ultra-wideband (UWB) system that may be used for millimeter wave communications (e.g., communications with a carrier frequency of about 60 GHz). A dual-mode UWB physical layer (PHY) may support a single carrier (SC) modulation and an Orthogonal Frequency Division Multiplexing (OFDM) modulation by employing a common mode (CM) transmission scheme. The CM is a single-carrier mode used by both SC and OFDM devices for beaconing, network-control signaling, and base-rate data communications.

The CM may be typically required for interoperability between different wireless devices and different wireless networks. It may be also advantageous, especially for low-power wireless devices, that the CM scheme employs a continuous phase modulation (CPM) providing a transmission signal with constant envelope. This transmission approach may ensure that power amplifiers at a transmitter operate at a maximum level of output power without affecting a spectrum of the CPM-based transmission signal.

Certain aspects of the present disclosure support methods for generating a frame structure that may be used for transmission of SC-modulated and OFDM-modulated signals. In one aspect, a chip rate of an OFDM transceiver may be set as 1.5 times a single carrier (SC) chip rate. The chip rate is also known as a sampling rate in the case of OFDM transmission scheme. For example, if the SC chip rate is set to 1728 MHz, which corresponds to the 3 dB bandwidth of 2160 MHz channel separation, then the OFDM sampling rate (i.e., the OFDM chip rate) may be 2592 MHz. If the OFDM mode employs a total of 512 subcarriers, then 154 of the subcarriers may be assigned as guard subcarriers (77 on each side of the occupied bandwidth), and there may be 354 data-bearing subcarriers occupying approximately 1728 MHz that may correspond to the bandwidth of the SC transmission mode.

The SC signal may employ $\pi/2$-BPSK modulation and may be spread by Golay codes before transmission. This may provide a quasi-constant envelope of the transmitted SC signal. Length-128 Golay codes may be used within a preamble and length-64 Golay codes may be used for spreading of data.

Figure 5:
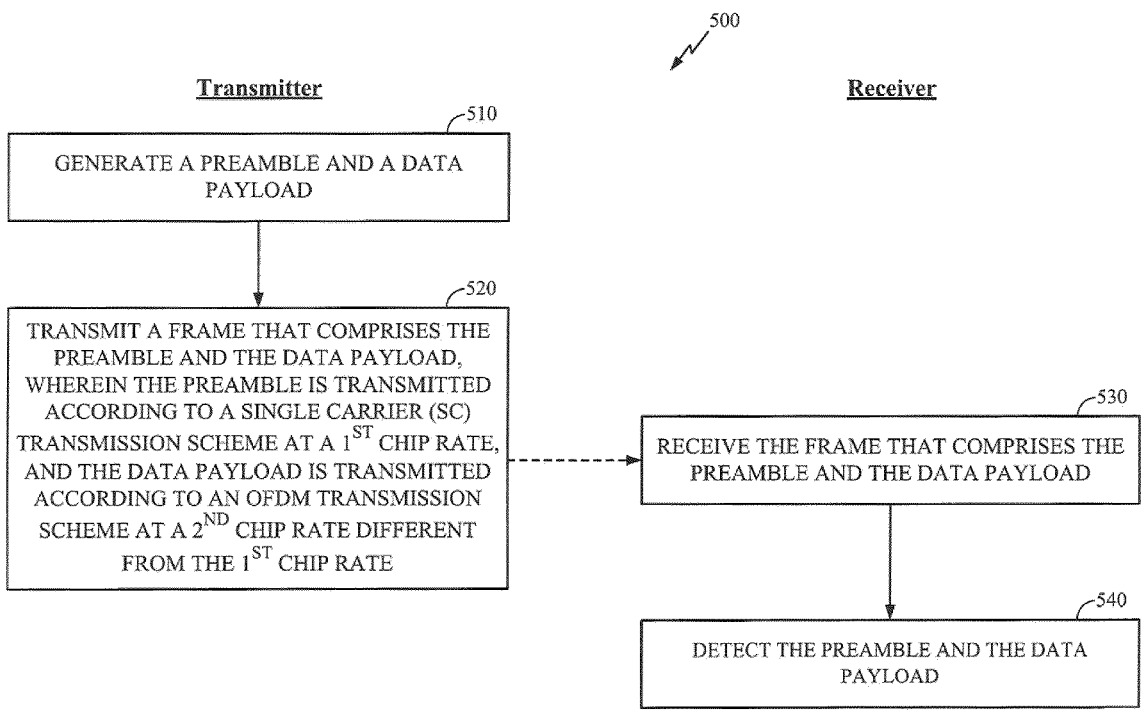
FIG. 5 illustrates operations for generating and processing a frame structure common for multiple transmission schemes in accordance with certain aspects of the present disclosure.

FIG. 5 summarizes operations for generating and processing a frame structure common for both SC and OFDM transmission schemes. Operations 510-520 may be performed at a transmitting side of the UWB system, and operations 530-540 may be performed at a receiver side of the UWB system.

At 510, a preamble and a data payload may be first generated at a transmitter. Following that, at 520, a frame comprising the preamble and the data payload may be transmitted over the wireless channel. The preamble may be transmitted over a wireless channel according to the SC transmission scheme at a first chip rate, and the data payload may be transmitted according to the OFDM transmission scheme at a second chip rate different from the first chip rate. At 530, the frame comprising the preamble and the data payload may be received at a receiver, wherein the received frame may be corrupted due to various effects of the wireless channel. At 540, the preamble and the data payload may be detected within the received frame.

Figure 6:
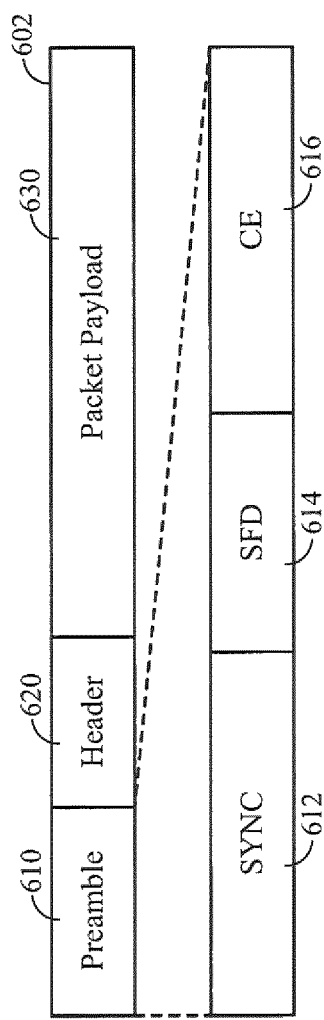
FIG. 6 illustrates a millimeter-wave frame structure for a common mode (CM) transmission in accordance with certain aspects of the present disclosure.

FIG. 6 illustrates a millimeter-wave frame structure 602 comprising a preamble 610 composed of at least one repetition of a length-128 Golay code $a_{128}$, a header 620 and a data payload 630. The data payload 630 may be spread using a length-64 Golay code pair (i.e., $a_{64}$ and/or $b_{64}$ codes).

The preamble 610 may further comprise a synchronization (SYNC) sequence field 612, a start-frame delimiter (SFD) field 614, and a channel-estimation sequence (CES) field 616. The SYNC field 612 may be used at the receiver for automatic gain control (AGC), DC-offset removal, frame detection, coarse frequency estimation, antenna switching, signal-direction finding, fine frequency estimation and channel estimation. The SFD field 614 may be used to indicate an end of the SYNC field 612 and a start of the CES field 616. The CES field 616 may be used for channel estimation and fine frequency estimation.

The SYNC sequence 612 may consist of a repetition of ones spread by Golay codes $a^i_{64}$ and/or $b^i_{64}$ (i.e., codes generated from the Golay codes $a_{64}$ and $b_{64}$ using a cyclic shift to the right of i samples). The SFD field 614 may comprise a sequence {1 −1 1 −1 . . . } spread by the Golay codes $a^i_{64}$ and/or $b^i_{64}$. The CES field 616 may be also spread using the Golay codes $a^i_{64}$ and/or $b^i_{64}$. The CES may be formed from a repetition of code $a^i_{64}$ followed by a repetition of code $b^i_{64}$. The header field 620 and the data field 630 may be binary or complex-valued, and may be also spread using the Golay codes $a^i_{64}$ and/or $b^i_{64}$.

Figure 7:
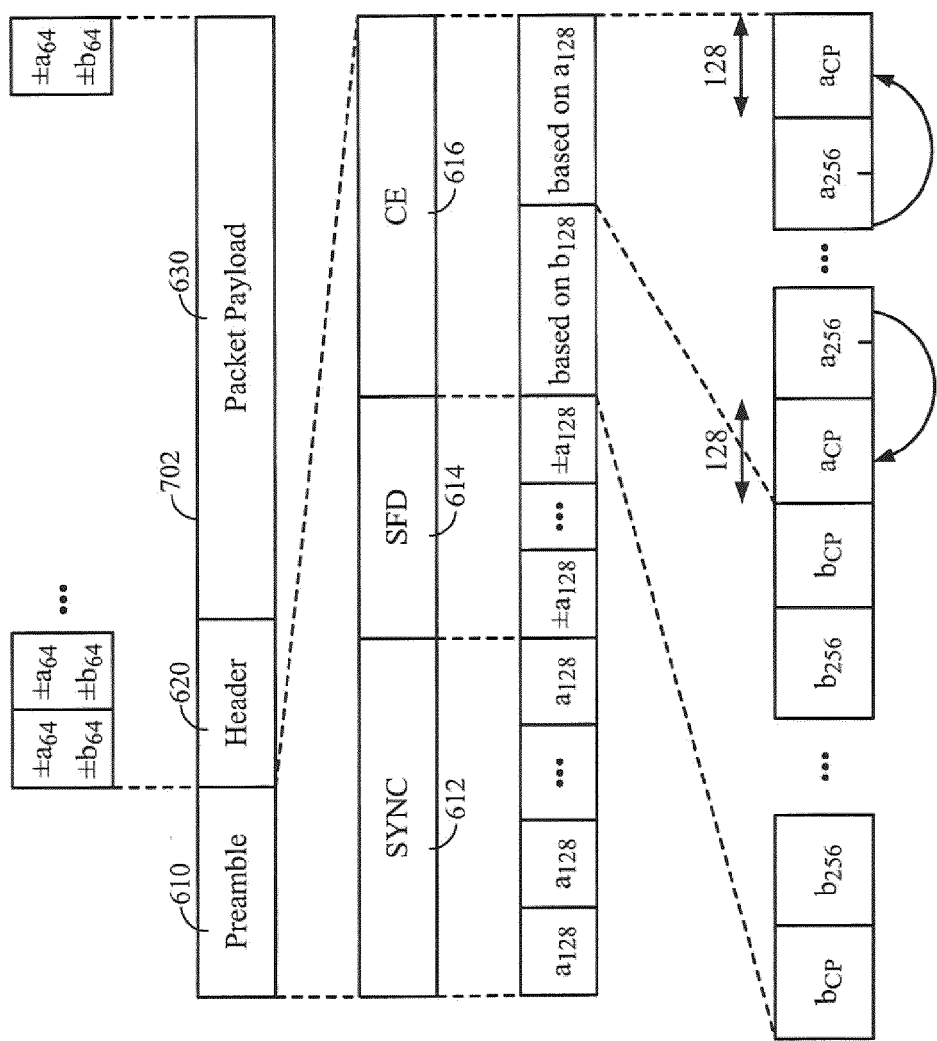
FIG. 7 illustrates a preamble structure of the millimeter-wave frame for the CM transmission in accordance with certain aspects of the present disclosure.

FIG. 7 illustrates a detailed structure of the frame 602 from FIG. 6, which is labeled as the frame 702. A Golay sequence $a_{128}$ of length 128 samples may be used for spreading to obtain the preamble 610. For example, complementary Golay code pairs may be generated using a delay vector D=[64 32 16 1 8 2 4] and a seed vector W=[1 1 1 1 −1 −1 1]. The generated complementary Golay code pairs may be expressed in hexadecimal notation as follows:

$$a_{128}\text{=30A99A0330A965FCCF5665FC30A965FC}, \quad (1)$$

$$b_{128}\text{=C0596AF3C059950C3FA6950CC059950C}, \quad (2)$$

wherein the least significant byte is to the left and the most significant byte is to the right.

The sequence $a_{128}$ may be selected such that to ensure the following properties: zero mean after being rotated by $\pi/2$ allowing easy DC-offset estimation, zero correlation zone (ZCZ) of 32 samples on each side of a main peak, a low side-lobe level of 16 samples outside the ZCZ. Furthermore, the Golay sequence $a_{128}$ may ensure that a parallel Golay matched filter can be employed at the receiver for detecting the preamble.

The length-64 complementary Golay codes may be used for spreading to generate the header 620 and the data payload 630. The Golay code $a_{64}$ may be used alone or in pair with the Golay code $b_{64}$. The following complementary Golay code pair may be generated using a delay vector D=[4 32 8 1 2 16] and a seed vector W=[−1 −1 1 1 1 1]:

$$a_{64}\text{=8822BB11782D4B1E}, \quad (3)$$

$$b_{64}\text{=77DDBB1187D24B1E}. \quad (4)$$

The pair of complementary Golay sequences given by equations (3)-(4) may provide a low level of cross-correlation with the preamble, a low side-lobe level of eight samples for any data sequence (e.g., if $a_{64}$ code is followed by $a_{64}$ or $-a_{64}$ or $b_{64}$ or $-b_{64}$, and if $b_{64}$ code is followed by $a_{64}$ or $-a_{64}$ or $b_{64}$ or $-b_{64}$), and a parallel Golay matched filter may be efficiently employed at the receiver for detecting the preamble and the data payload.

In one aspect of the present disclosure, the spreading sequence may be changed randomly (or, more precisely, pseudo-randomly) from $a_{64}$ code to $b_{64}$ code. For example, a linear feedback shift register (LFSR) may be employed, such as the one illustrated in FIG. 8. If a value at a selection input 820 of a multiplexer 810 is equal to zero, then the sequence $a_{64}$ may be selected for spreading of a current bit of a seed vector. Otherwise, the sequence $b_{64}$ may be selected for spreading of the current bit of the seed vector. This randomization approach may whiten the spectrum of a transmission signal and remove all spectral lines. The randomization may also improve channel tracking at the receiver because a sum of matched filter outputs from $a_{64}$ and $b_{64}$ sequences, when combined, may provide the ideal Dirac signal characteristics (i.e. no side-lobes are present).

Figure 9:
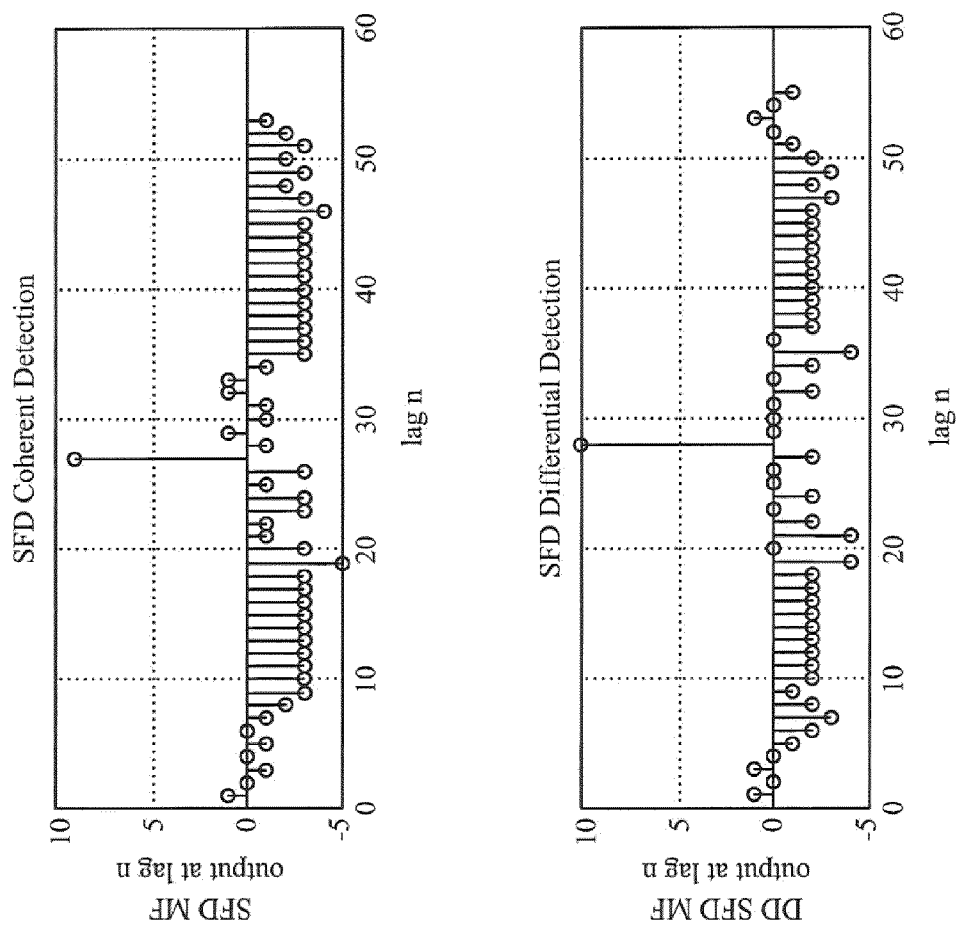
FIG. 9 illustrates output signals of a receiver matched-filter for coherently detected and differentially detected start frame delimiter (SFD) sequence in accordance with certain aspects of the present disclosure.

In one aspect of the present disclosure, the SFD sequence within the preamble may be generated from a seed vector W=[-1 -1 -1 1 -1 1 -1 -1 -1] spread with the Golay code $a_{128}$ from equation (1). Therefore, the SFD sequence [$-a_{128}$ $-a_{128}$ $-a_{128}$ $a_{128}$ $-a_{128}$ $a_{128}$ $-a_{128}$ $-a_{128}$ $-a_{128}$] may be obtained. This SFD sequence may be detected at the receiver either coherently or differentially. Matched-filter (MF) outputs for the coherently detected SFD and the differentially detected (DD) SFD are illustrated in FIG. 9.

In aspect of the present disclosure, the header and data payload may be encoded using a rate-1/2 Low Density Parity Check (LDPC) codes. Other aspects of the present disclosure support encoding of the header and data payload based on some other Forward Error Correction (FEC) codes.

The channel estimation sequence (CES) within the preamble may utilize a complementary pair of Golay codes of length 256 samples or of length 128 samples. A delay vector D=[128 64 32 8 2 16 1 4] and a seed vector W=[1 1 1 1 1 -1 1 1] may be employed to generate the following complementary Golay codes of length 256 samples:

$$a_{256}=05C99C5005369CAF05C99C50FAC96350FA3663AFFAC963\\5005C99C50FAC96350, \quad (5)$$

and $$b_{256}=F5396CAOF5C66C5FF5396CAOOA3993AOOAC6935FOA3\\993AOF5396CAOOA3993AO. \quad (6)$$

The pair of complementary Golay codes given by equations (5)-(6) may provide a low level of cross-correlation with the preamble sequence, a low side-lobe level of 16 samples, zero correlation zone (ZCZ) of 64 samples on each side of a main peak, and may be efficiently processed with the parallel Golay matched filter such that a common matched filter can be configured for processing the CES, the whole preamble, and the payload.

Single Carrier Frame Structure

The single-carrier (SC) frame structure may be similar to the CM frame structure illustrated in FIGS. 6 and 7. However, an SC preamble may be shorter compared to a CM preamble. The SC preamble may support two preamble modes, i.e., a medium-sized preamble and a short-sized preamble. Difference between long, medium, and short preambles may be in the number of repetitions of Golay sequence $a_{128}$ given by equation (1) within the SYNC field, within the SFD length, as well as in the number of repetitions of Golay sequences $a_{256}$ and $b_{256}$ from equations (5)-(6) (or, alternatively, $a_{128}$ and $b_{128}$ sequences from equations (1)-(2)) within the CES field.

Figure 10:
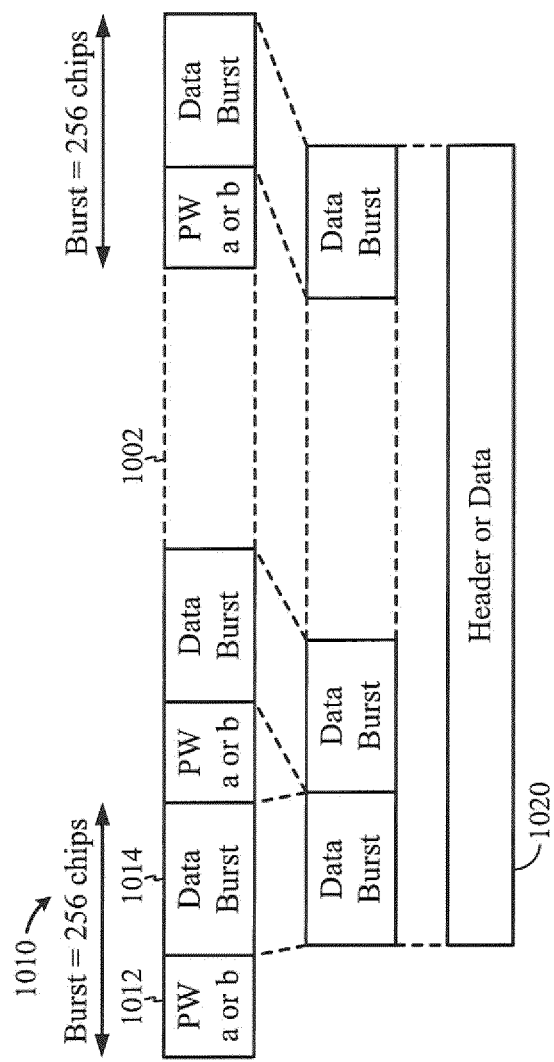
FIG. 10 illustrates an example of a single carrier (SC) frame structure in accordance with certain aspects of the present disclosure.

In order to achieve medium and high data rates, a burst structure may be employed for data transmissions. FIG. 10 illustrates an example of a bursty SC frame structure. The SC frame (i.e., a data packet) 1002 may be first encoded utilizing some Forward Error Correction (FEC) code and may be mapped into either π/2-BPSK or π/2-QPSK modulations. After that, the modulated data packet 1002 may be partitioned into a plurality of data bursts 1010, as illustrated in FIG. 10. The data burst 1010 may comprise a data portion 1014 preceded by a known Golay sequence 1012 (i.e., a Pilot Word (PW)) of length 64 samples or 16 samples. The burst length may be fixed in both cases to 256 samples.

The length-64 PW may be used for severe multipath environments (i.e., environments with a large number of channel paths), whereas the length-16 PW may be used for quasi-line-of-sight environments with few channel paths. A header portion of a sequence 1020 may employ PWs of length 64 samples for all types of signaling. On the other hand, a data portion of the sequence 1020 may employ a PW of length 64 or 16 samples, and the length of the PW may be signaled within the header portion of the sequence 1020 using a one-bit PW_Flag. For example, if the PW_Flag is equal to 0, then the length of the PW is 64 samples, and if the PW_Flag is equal to 1, then the length of the PW is 16 samples.

For the PW length of 64 samples, the Golay sequences $a_{64}$ and $b_{64}$ used for spreading of data samples may be also directly used as the PW. On the other hand, the length-16 PWs may employ the following Golay complementary code pairs with the ZCZ of four samples, and the side-lobe level of four samples: $a_{16}$=2D11, $b_{16}$=7844 obtained using a delay vector D=[4 8 2 1] and a seed vector W=[1 -1 1 1]. In one aspect of the present disclosure, only a pilot word of a Golay type (a) (i.e. Golay codes $a_{64}$ or $a_{16}$) may be used. In another aspect of the present disclosure, the data payload may be partitioned into sub-blocks. Even-numbered sub-blocks may use Golay type (a) codes and odd-numbered sub-blocks may use Golay type (b) codes.

Figure 11:
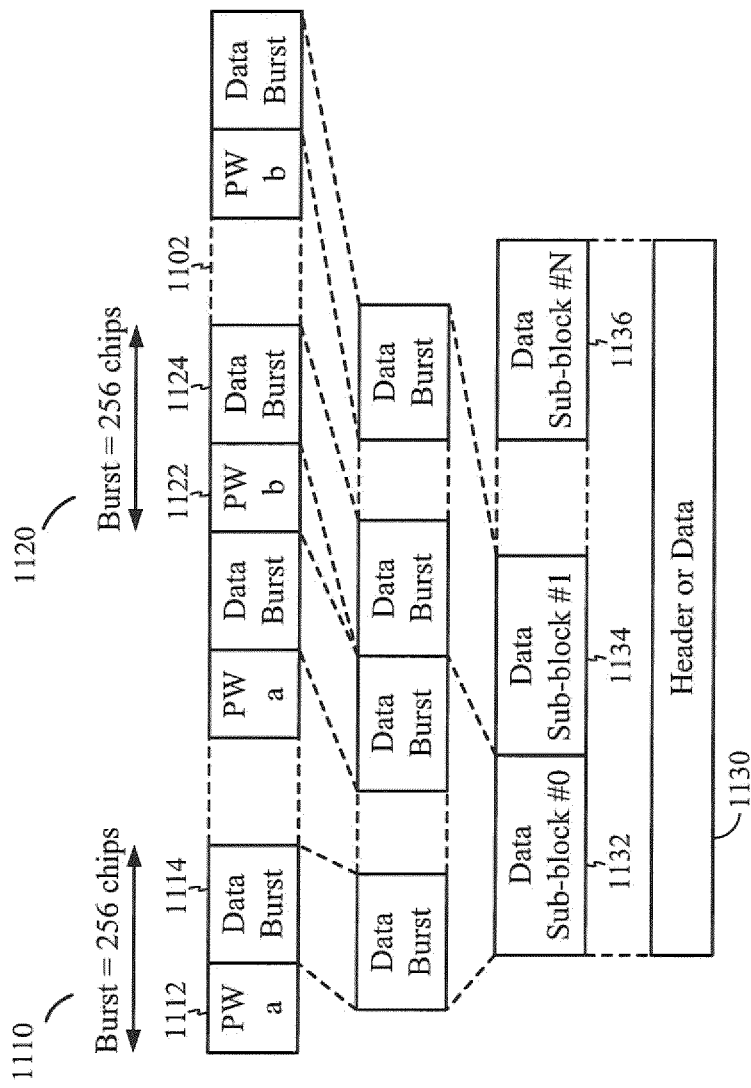
FIG. 11 illustrates another example of a frame structure for SC transmission scheme in accordance with certain aspects of the present disclosure.

In one aspect of the present disclosure, such as the one illustrated in FIG. 11, the PW may be further randomized by using Golay codes a and –a for even sub-blocks of data, while Golay codes b and –b may be used for odd sub-blocks of data. A data packet 1102 may be partitioned into data bursts 1110 and 1120. The burst 1110 may comprise a data portion 1114 preceded by a Golay type (a) code 1112, and the burst 1120 may comprise a data portion 1124 preceded by a Golay type (b) code 1122, as illustrated in FIG. 11.

Figure 8:
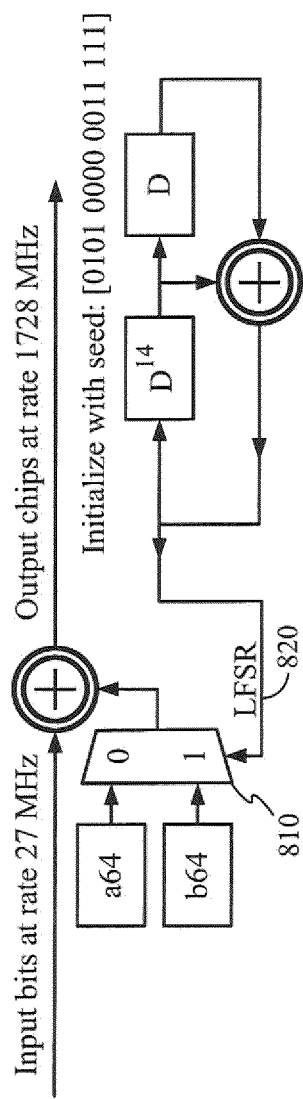
FIG. 8 illustrates a logic block diagram of a linear feedback shift register (LFSR) for generating a spreading sequence for the CM preamble in accordance with certain aspects of the present disclosure.

An LFSR similar to the one illustrated in FIG. 8 may be employed for selection of spreading sequences. For example, if a first LFSR output is 0, then the Golay code a may be used for spreading to generate a sub-block 1132, and if the first LFSR output is 1, then the Golay code –a may be used for spreading to generate the sub-block 1132. If a second LFSR output is 0, then the sequence b may be used for spreading to generate a sub-block 1134, and if the second LFSR output is 1 then the sequence –b may be used for spreading to generate the sub-block 1134, and so on. This particular randomization may whiten a spectrum of the transmission signal and may remove spectral lines. The randomization may also improve timing, frequency and channel tracking at the receiver because a sum of matched-filter outputs from sequences $a_{64}$ and $b_{64}$, when combined, may provide the ideal Dirac impulse response.

OFDM Frame Structure

An OFDM preamble may employ the same Golay delay vector D=[64 32 8 2 16 1 4] utilized for generating the preamble in the SC transmission scheme in order to reuse the same hardware resources. In one aspect of the present disclosure, this particular delay vector may be employed along with a seed vector W=[−1 −1 −1 1 −1 j 1] to generate the following length-128 preamble sequences for OFDM transmission scheme:

$$a_{R128}=5063C9FAAF6336FA5063C9FA509CC905, \quad (7)$$

$$a_{I128}=FAC9635005C99C50FAC96350FA3663AF, \quad (8)$$

where $a_{R128}$ is a real part of the $a_{128}$ sequence, and $a_{I128}$ is an imaginary part of the $a_{128}$ sequence, since the sequence $a_{128}$, is a complex sequence (i.e., $a_{128}=a_{R128}+j\cdot a_{I128}$). In one aspect of the present disclosure, the OFDM transmission scheme may employ a sampling rate of 2592 MHz (i.e., 1.5 times a sampling rate of the SC transmission scheme).

The OFDM Golay sequence $a_{128}$ given by equations (7)-(8) may be generated to have the following properties: zero mean on both real part and imaginary part allowing easy DC offset estimation, zero correlation zone (ZCZ) of 32 samples on each side of a main peak, a low side-lobe level of 16 samples outside the ZCZ. Furthermore, the OFDM Golay sequence $a_{128}$ may allow the efficient use of a parallel Golay matched filtering at a receiver, as well as a low peak-to-average power ratio after filtering (i.e., less than 3 dB).

A channel estimation sequence (CES) within the OFDM preamble may use compatible complementary Golay codes of length 512 samples. For example, a delay vector D=[256 128 64 32 8 2 16 1 4] and a seed vector W=[−1−j −1 j j 1 1 −j j] may be used to produce the following complementary complex Golay codes:

$$a_{R512}=FF69990FA533C355009666FOA533C3555A333C55FF9699\\F05A333C550069660FFF69990FA533C355009666FOA533\\C355A5CCC3AA0069660FA5CCC3AAFF9699FO, \quad (9)$$

$$a_{I512}=5A333C55FF9699FOA5CCC3AAFF9699F0009666F05ACC3\\CAA009666FOA533C3\\555A333C55FF9699FOA5CCC3AAFF9699FOFF69990FA533\\C355FF69990F5ACC3CAA, \quad (10)$$

$$b_{R512}=OF9969FF55C333A5F066960055C333A5AAC3CCA50F666\\900AAC3CCA5F0999F\\FOF9969FF55C333A5F066960055C333A5553C335AF09996\\FF553C335AOF666900, \quad (11)$$

$$b_{I512}=AAC3CCA50F666900553C335AOF666900F0669600AA3C\\CC5AF066960055C333A5AAC3CCA50F666900553C335\\AOF6669000F9969FF55C333A50F9969FFAA3CCC5A. \quad (12)$$

The complex Golay codes given by equations (9)-(10) and (11)-(12) may have the following properties: a low level of cross-correlation with the preamble sequence, a low side-lobe level of 36 samples, a ZCZ of 128 samples on each side of a main peak, and may allow for efficient parallel Golay matched filtering at the receiver, wherein a single matched filter may be configured for detecting the CES and the remaining part of the preamble. Furthermore, both complex Golay codes given by equations (9)-(10) and equations (11)-(12) may be compatible with the preamble, i.e., the delay vector of the preamble may be included in the delay vector of the CES. In one aspect of the present disclosure, a single configurable parallel matched filter may be used for detecting all sequences within the preamble for both SC and OFDM transmission schemes.

For the OFDM transmission, preamble sequences may have a length of 256 samples and a compatible set of CES sequences of length 512 samples may be used. The following complex preamble sequence of length 256 samples may be generated using a delay vector D=[128 64 32 8 2 16 1 4] and a seed vector W=[1 j 1 j −1 1 j j]:

$$a_{R256}66F00096660F00693C555A33C355A533990FFF6999FOF963\\C555A33C355A533, \quad (13)$$

$$a_{I256}C3AAA5CCC355A53366F0009699FOFF963C555A333CAA5\\ACC66F0009699FOFF96, \quad (14)$$

while the compatible set of length-512 complex CES sequences generated using a delay vector D=[256 128 64 32 8 2 16 1 4] and a seed vector W=[1 −j 1 j j 1 1 −j j] maybe:

$$a_{R512}=FF69990FA533C355FF69990F5ACC3CAA5A333C55FF969\\9FOA5CCC3AAFF9699FO009666F05ACC3CAA009666FOA\\533C3555A333C55FF9699FOA5CCC3AAFF96\\99FO, \quad (15)$$

$$a_{I512}=5A333C55FF9699F05A333C550069660F009666F05ACC3C\\AAFF69990F5ACC3CA\\AA5CCC3AA0069660FA5CCC3AAFF9699F0009666F05A\\CC3CAAFF69990F5ACC3CAA, \quad (16)$$

$$b_{R512}=OF9969FF55333A50F9969FFAA3CCC5AAAC3CCA50F6\\66900553C335AOF6669\\00F0669600AA3CCC5AF066960055C333A5AAC3CCA50F\\666900553C335AOF666\ 900, \quad (17)$$

$$b_{I512}=AAC3CCA50F666900AAC3CCA5F09996FFF0669600AA3\\CCC5AOF9969FFAA3CC\\C5A553C335AF09996FF553C335AO666900F0669600AA3C\\CC5AOF9969FFAA3C CC5A. \quad (18)$$

Unified Frame Structure

The common mode (CM) transmission scheme enables coexistence between different modes, such as a single carrier (SC) mode and a High Speed Interface (HSI) OFDM mode. However, a wireless system may be further configured to operate in a Carrier Sense Multiple Access with Collision Avoidance (CSMA/CA) mode, which is the mode employed in the Institute of Electrical and Electronics Engineers (IEEE) 802.11 protocol using a Clear Channel Assessment (CCA). A subscriber device may be able to determine whether a transmission medium is busy by detecting a preamble and by determining from the preamble a duration of the frame. Once the subscriber device knows the frame length, it will be also known that the medium will be in use for a specific period of time.

Figure 12:
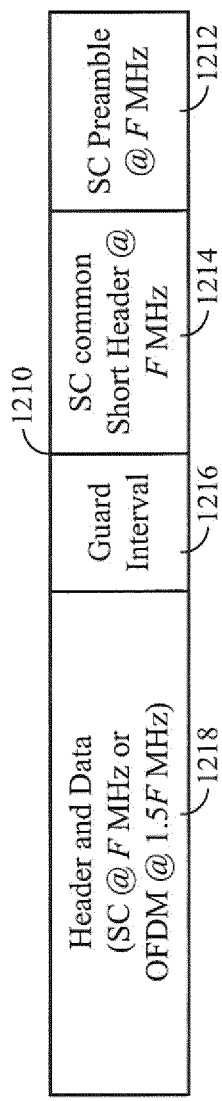
FIG. 12 illustrates a unified frame structure supporting both SC and Orthogonal Frequency Division Multiplexing (OFDM) transmission schemes in accordance with certain aspects of the present disclosure.

In order to facilitate operation in a Contention Access Period (CAP) part of a super-frame in the IEEE 802.15.3 specification, a unified frame format 1210 illustrated in FIG. 12 may be employed, wherein the IEEE 802.15.3 super-frame may comprise at least one unified frame 1210. A preamble 1212 of the frame 1210 may be transmitted using the SC scheme, while the frame 1210 may be either the SC frame or the OFDM frame. The preamble 1212 may use the same sequences as for the common mode, but a number of repetitions of sequences in each field including the SFD field may vary. The preamble 1212 may be transmitted at the SC chip rate of, for example, F=1728 MHz.

A common short header 1214 may be employed in order to allow the subscriber device to determine for how long the transmission medium is busy. The common short header 1214 may be transmitted at the SC chip rate, and may comprise the following fields illustrated in FIG. 13: a frame length field 1302, a Modulation and Coding Scheme (MCS) field 1304, an SC/OFDM bit 1306 indicating if the SC or the OFDM transmission scheme is employed for transmission of the frame 1210, a Reserved (RES) field 1308, and a Cyclic Redundancy Check (CRC) field 1310. The frame length specified within the frame length field 1302 may be given in octets.

Value of the MCS field 1304 and information about the frame length may enable the subscriber device to compute the frame duration. Alternatively, the common short header 1214 may contain the frame duration in some units, such as, for example, in milliseconds. The SC transmission mode may employ various MCSs. Depending on which MCS is utilized, different data rates may be achieved, such as, for example, 350 Mbps, 700 Mbps, 1.5 Gbps, and 3 Gbps.

Figure 13:
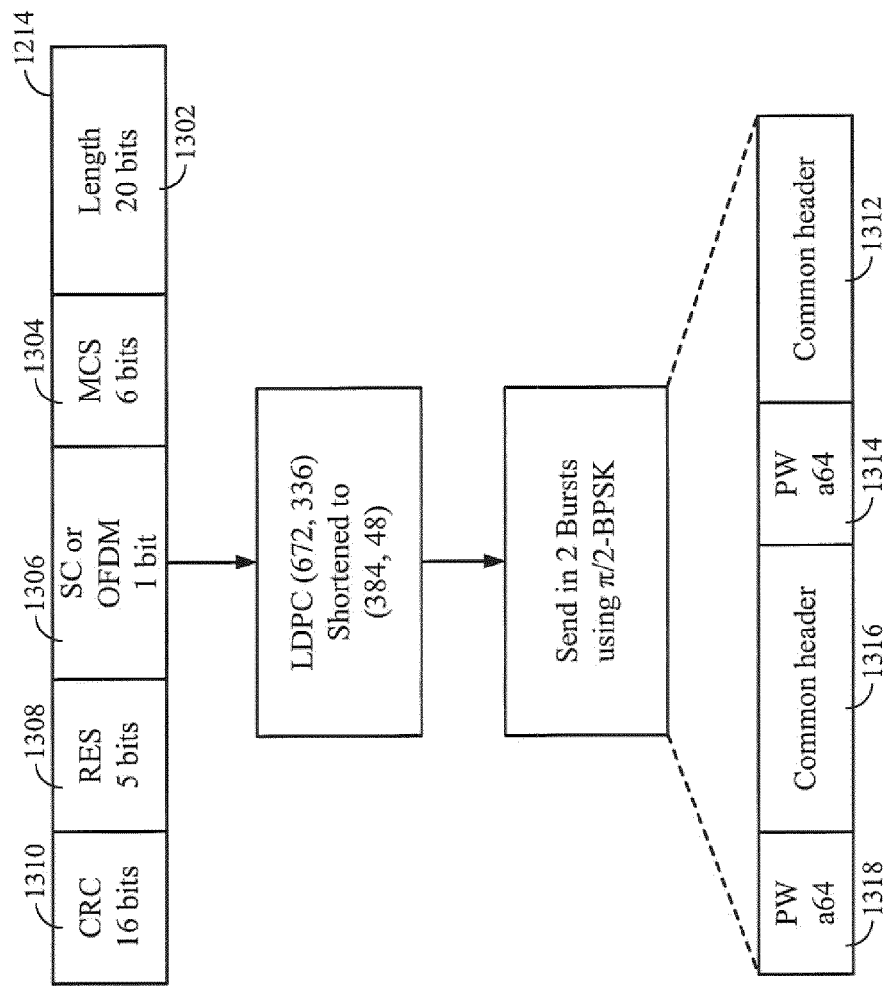
FIG. 13 illustrates a structure of a common short header within the unified frame in accordance with certain aspects of the present disclosure.

The common short header 1214 may be transmitted in two bursts following a Forward Error Correction (FEC) encoding, such as a Low Density Parity Check (LDPC) encoding. A shortened LDPC code may be generated from a rate-1/2 LDPC code, as illustrated in FIG. 13. A first step may provide for appending 288 zeros to 48 bits of the short header 1214. A second step may provide for encoding the short header 1214 using a rate-1/2 LDPC(672, 336) code. After discarding the 288 zeros, a resulting code may be shortened to LDPC(384, 48) code. A third step may provide for transmitting the first 192 bits in a first data slot (i.e., a PW 1314 which may be the Golay code $a_{64}$ and a common header portion 1312) and for transmitting remaining 192 bits in a second data slot (i.e., a PW 1318 which may be the Golay code $a_{64}$ and a common header portion 1316).

Referring back to FIG. 12, a short Guard interval 1216 following the common short header 1214 may allow switching from the SC chip rate to the OFDM chip rate (e.g., from F=1728 MHz to 1.5 F=2592 MHz). A remaining portion 1218 of the frame 1210 (i.e., the header and the data portion) may be transmitted either in the SC mode or in the OFDM mode using the corresponding chip rate.

Figure 5A:
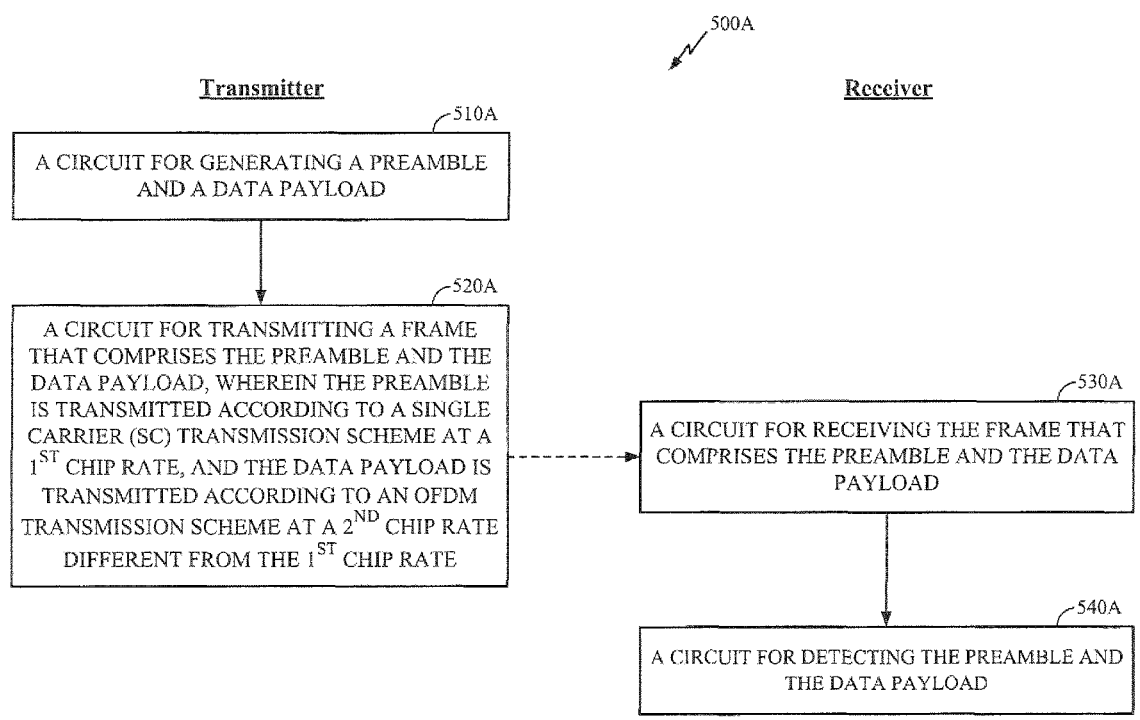
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 510-540 illustrated in FIG. 5 correspond to circuit blocks 510A-540A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
generating a preamble and a data payload; and
transmitting a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme.

2. The method of claim 1, wherein the second chip rate is 1.5 times higher than the first chip rate.

3. The method of claim 1, wherein the preamble or the data payload is generated by using one or more Golay codes.

4. The method of claim 1, wherein the preamble comprises a Synchronization (SYNC) sequence, a Start Frame Delimiter (SFD) and a Channel Estimation Sequence (CES), and wherein the SYNC, the SFD and the CES are all spread by using Golay codes.

5. The method of claim 1, further comprising:
generating a short header within the frame; and
transmitting the short header following the preamble, wherein the short header is transmitted according to the SC transmission scheme at the first chip rate.

6. The method of claim 5, wherein the short header comprises information indicating duration of the frame.

7. The method of claim 5, wherein the short header is generated by using a low-density parity-check (LDPC) encoding.

8. The method of claim 1, wherein transmitting the frame comprises transmitting in a contention access period (CAP) of a super-frame defined by a piconet controller.

9. An apparatus for wireless communications, comprising:
a generator configured to generate a preamble and a data payload; and
a transmitter configured to transmit a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme.

10. The apparatus of claim 9, wherein the second chip rate is 1.5 times higher than the first chip rate.

11. The apparatus of claim 9, wherein the preamble or the data payload is generated by using one or more Golay codes.

12. The apparatus of claim 9, wherein the preamble comprises a Synchronization (SYNC) sequence, a Start Frame Delimiter (SFD) and a Channel Estimation Sequence (CES), and wherein the SYNC, the SFD and the CES are all spread by using Golay codes.

13. The apparatus of claim 9, further comprising:
a generating circuit configured to generate a short header within the frame; and
a circuit configured to transmit the short header following the preamble, wherein the short header is transmitted according to the SC transmission scheme at the first chip rate.

14. The apparatus of claim 13, wherein the short header comprises information indicating duration of the frame.

15. The apparatus of claim 13, wherein the short header is generated by using a low-density parity-check (LDPC) encoding.

16. The apparatus of claim 9, wherein the transmitter configured to transmit the frame of data comprises a circuit configured to transmit in a contention access period (CAP) of a super-frame defined by a piconet controller (PNC), wherein the apparatus and the PNC are in the same piconet.

17. An apparatus for wireless communications, comprising:
means for generating a preamble and a data payload; and
means for transmitting a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme.

18. The apparatus of claim 17, wherein the second chip rate is 1.5 times higher than the first chip rate.

19. The apparatus of claim 17, wherein the preamble or the data payload is generated by using one or more Golay codes.

20. The apparatus of claim 17, wherein the preamble comprises a Synchronization (SYNC) sequence, a Start Frame Delimiter (SFD) and a Channel Estimation Sequence (CES), and wherein the SYNC, the SFD and the CES are all spread by using Golay codes.

21. The apparatus of claim 17, further comprising:
means for generating a short header within the frame; and
means for transmitting the short header following the preamble, wherein the short header is transmitted according to the SC transmission scheme at the first chip rate.

22. The apparatus of claim 21, wherein the short header comprises information indicating duration of the frame.

23. The apparatus of claim 21, wherein the short header is generated by using a low-density parity-check (LDPC) encoding.

24. The apparatus of claim 17, wherein the means for transmitting the frame comprises means for transmitting in a contention access period (CAP) of a super-frame defined by a piconet controller (PNC), wherein the apparatus and the PNC are in the same piconet.

25. A computer-program product for wireless communications, comprising a computer-readable storage device encoded with instructions executable to:
  generate a preamble and a data payload; and
  transmit a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme.

26. A wireless node, comprising:
  at least one antenna;
  a generator configured to generate a preamble and a data payload; and
  a transmitter configured to transmit via the at least one antenna a frame comprising the preamble and the data payload, wherein the preamble is transmitted according to a single carrier (SC) transmission scheme at a first chip rate and the data payload is transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme.

27. A method for wireless communications, comprising:
  receiving a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme; and
  detecting the preamble and the data payload.

28. The method of claim 27, wherein detecting the preamble and the data payload comprises filtering the frame using a common configurable parallel matched filter.

29. The method of claim 28, wherein a Synchronization (SYNC) sequence, a Start Frame Delimiter (SFD) and a Channel Estimation Sequence (CES) of the preamble are all detected using the common configurable parallel matched filter.

30. The method of claim 27, wherein the second chip rate is 1.5 times higher than the first chip rate.

31. The method of claim 27, wherein the preamble comprises Golay codes.

32. An apparatus for wireless communications, comprising:
  a receiver configured to receive a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme; and
  a detector configured to detect the preamble and the data payload.

33. The apparatus of claim 32, wherein the second chip rate is 1.5 times higher than the first chip rate.

34. The apparatus of claim 32, wherein the preamble comprises Golay codes.

35. The apparatus of claim 32, wherein the detector configured to detect the preamble and the data payload comprises a circuit configured to filter the frame using a common configurable parallel matched filter.

36. The apparatus of claim 35, wherein a Synchronization (SYNC) sequence, a Start Frame Delimiter (SFD) and a Channel Estimation Sequence (CES) of the preamble are all detected using the common configurable parallel matched filter.

37. An apparatus for wireless communications, comprising:
  means for receiving a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme; and
  means for detecting the preamble and the data payload.

38. The apparatus of claim 37, wherein the second chip rate is 1.5 times higher than the first chip rate.

39. The apparatus of claim 37, wherein the preamble comprises Golay codes.

40. The apparatus of claim 37, wherein the means for detecting the preamble and the data payload comprises means for filtering the frame using a common configurable parallel matched filter.

41. The apparatus of claim 40, wherein a Synchronization (SYNC) sequence, a Start Frame Delimiter (SFD) and a Channel Estimation Sequence (CES) of the preamble are all detected using the common configurable parallel matched filter.

42. A computer-program product for wireless communications, comprising a computer-readable storage device encoded with instructions executable to:
  receive a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme; and
  detect the preamble and the data payload.

43. A wireless node, comprising:

at least one antenna;

a receiver configured to receive via the at least one antenna a frame comprising a preamble and a data payload, wherein the preamble was transmitted over a wireless channel according to a single carrier (SC) transmission scheme at a first chip rate and the data payload was transmitted according to an Orthogonal Frequency Division Multiplexing (OFDM) transmission scheme at a second chip rate different from the first chip rate, wherein the OFDM transmission scheme comprises a plurality of data-bearing subcarriers and a plurality of guard subcarriers, and wherein a first bandwidth of the data-bearing subcarriers is the same as a second bandwidth of the SC transmission scheme; and a detector configured to detect the preamble and the data payload.

* * * * *